Feb. 8, 1955 J. A. SMITH 2,701,662
ENVELOPE DISPENSING MACHINE
Filed Jan. 27, 1951 7 Sheets-Sheet 1
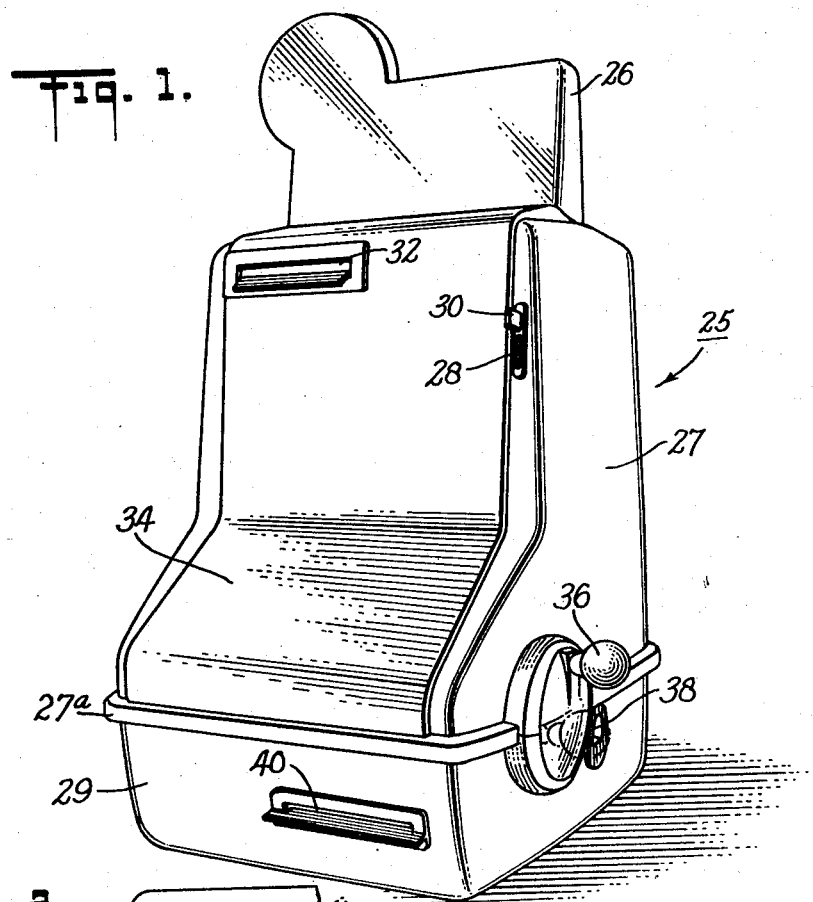
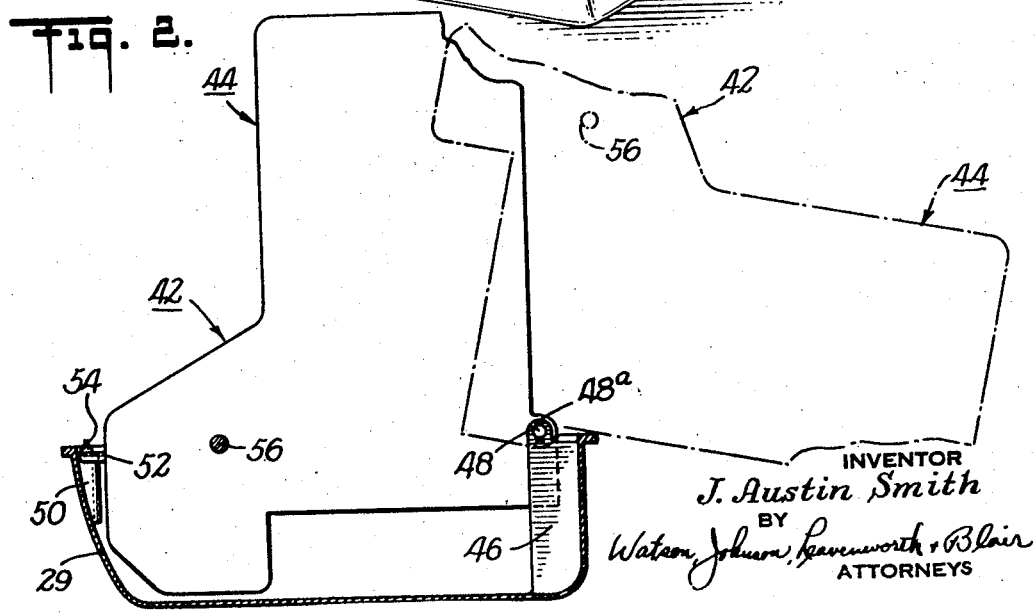
INVENTOR
J. Austin Smith
BY
Watson, Johnson, Leavenworth & Blair
ATTORNEYS

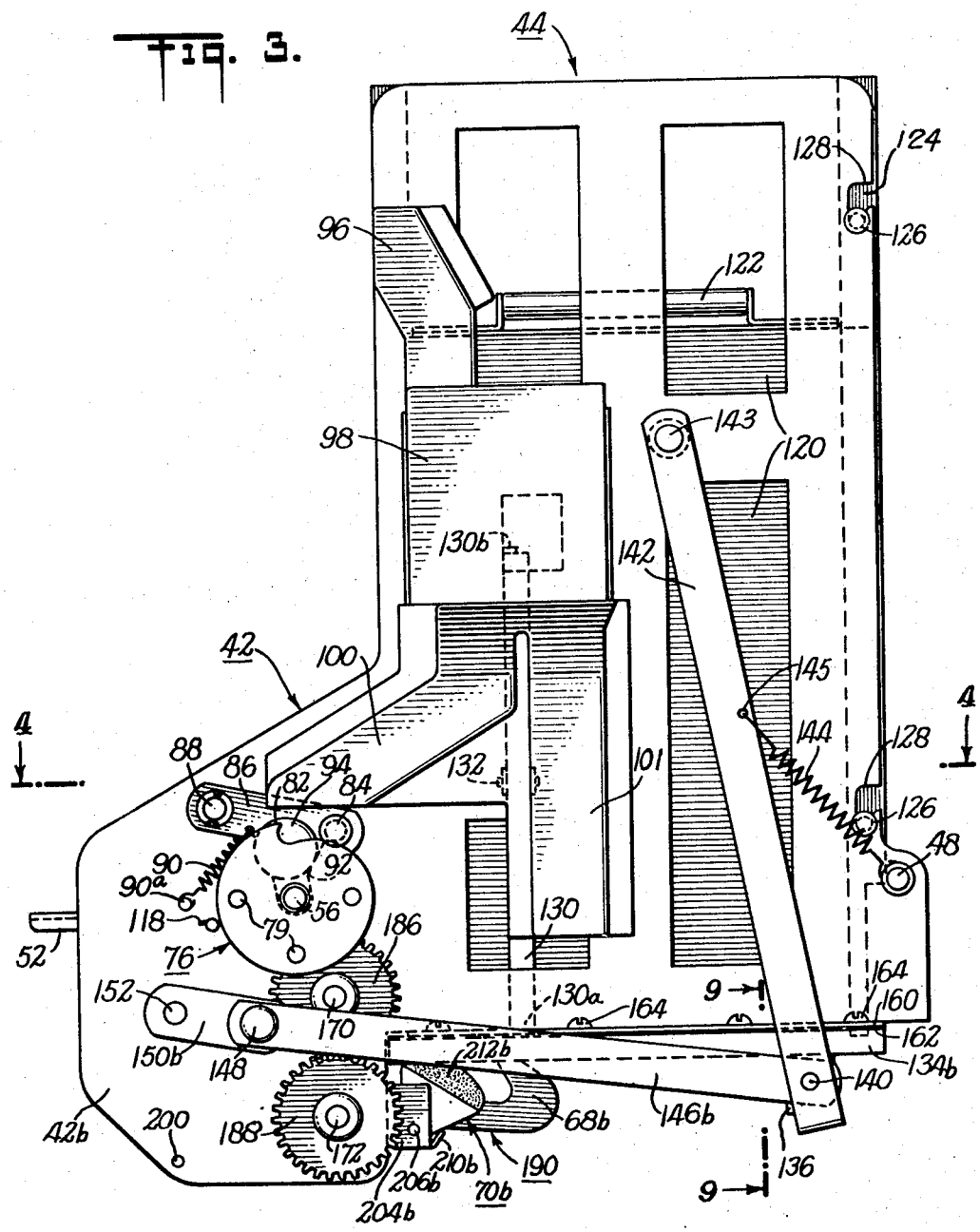

Feb. 8, 1955   J. A. SMITH   2,701,662
ENVELOPE DISPENSING MACHINE
Filed Jan. 27, 1951   7 Sheets-Sheet 3
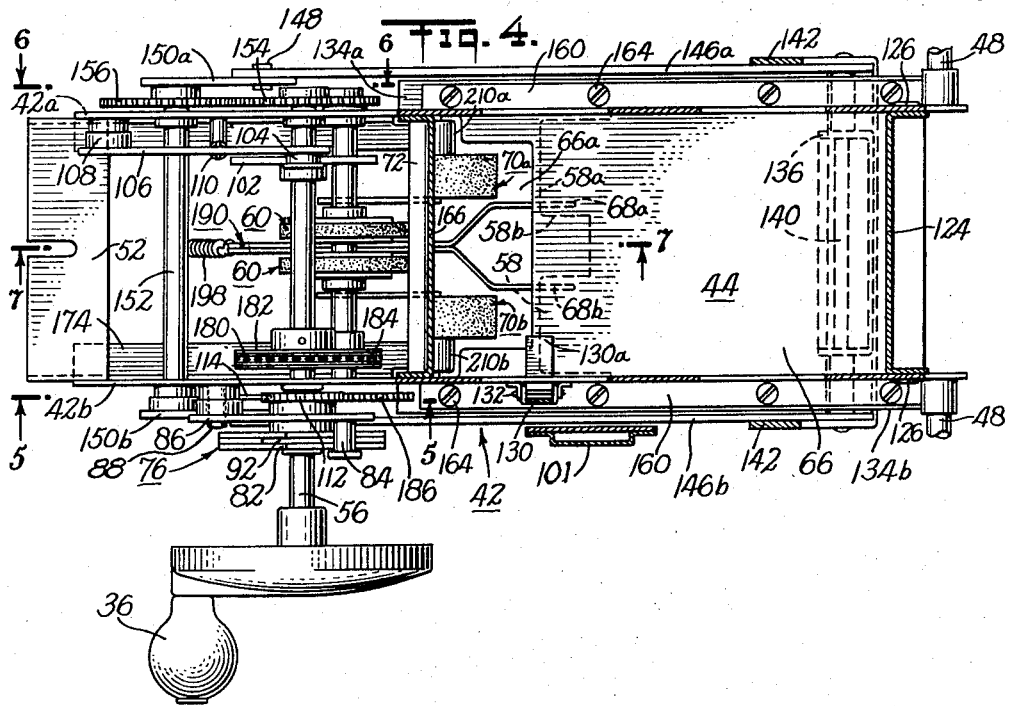
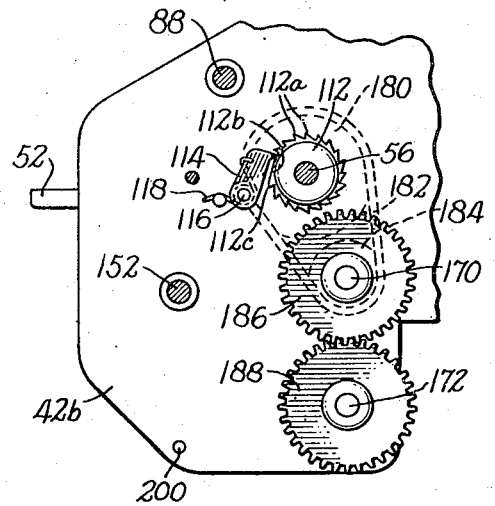
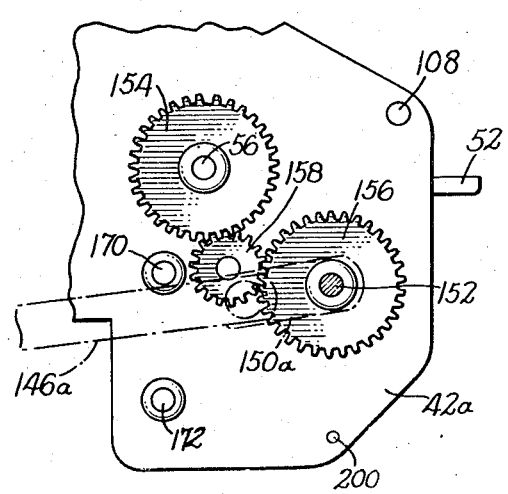
INVENTOR
J. Austin Smith
BY
Watson, Johnson, Leavenworth & Blair
ATTORNEYS

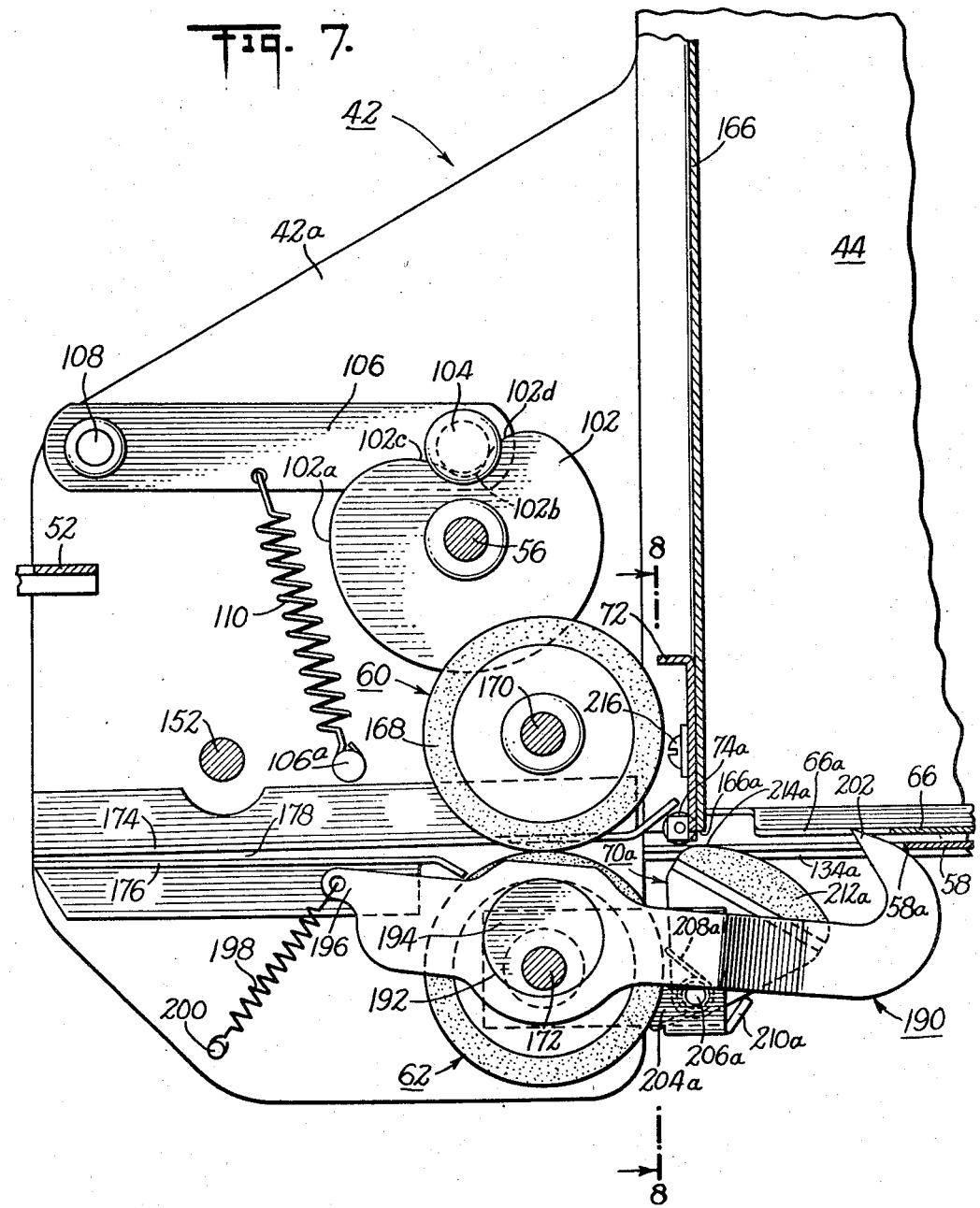

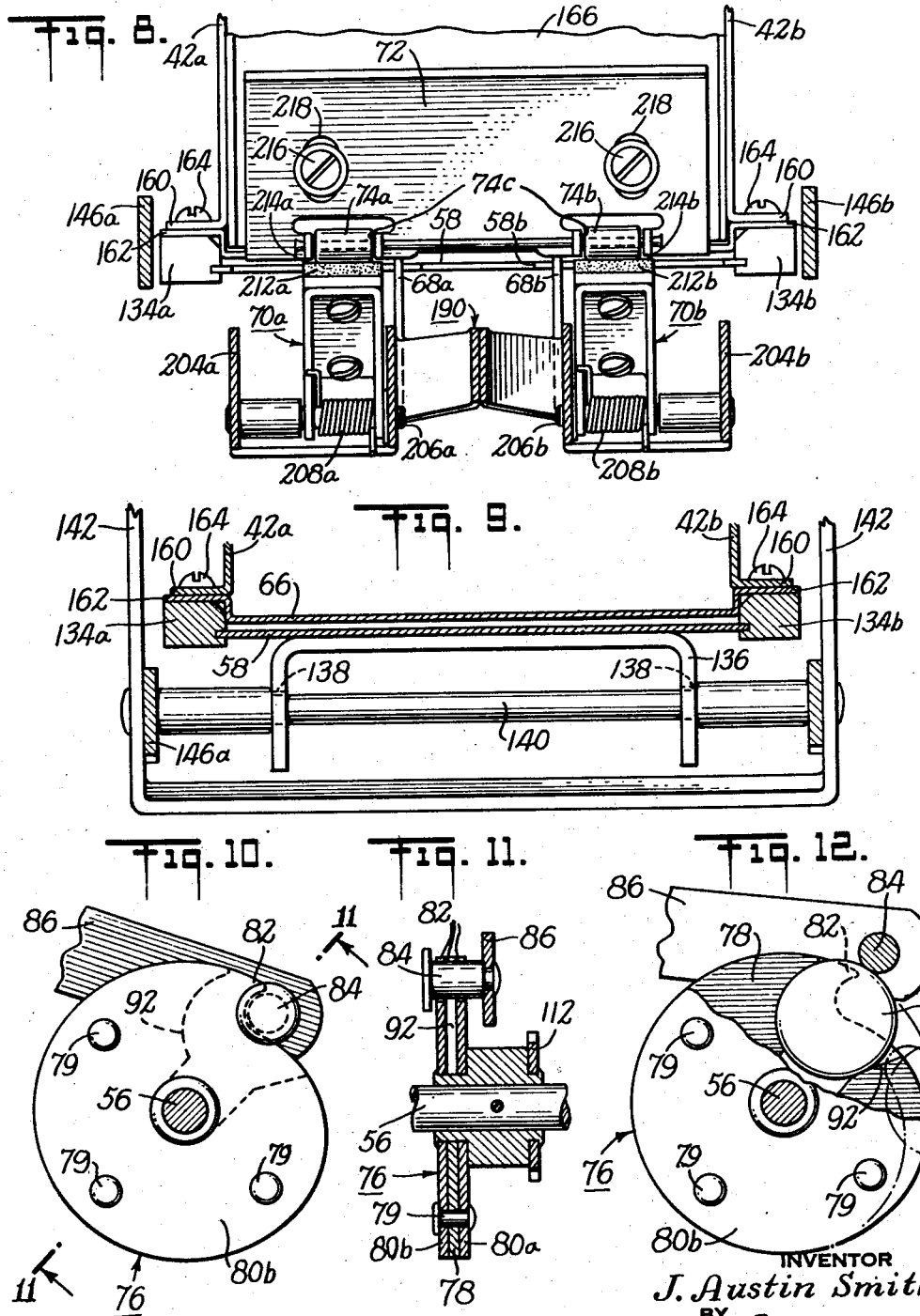

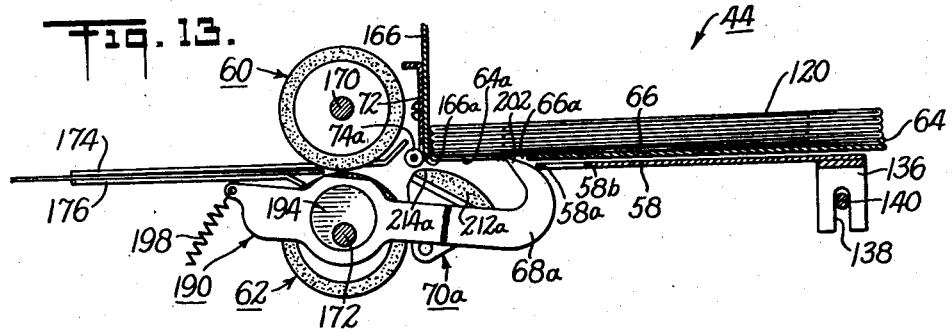
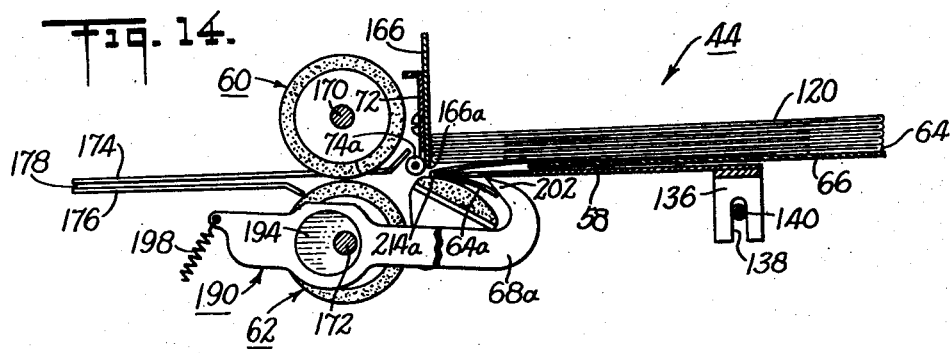
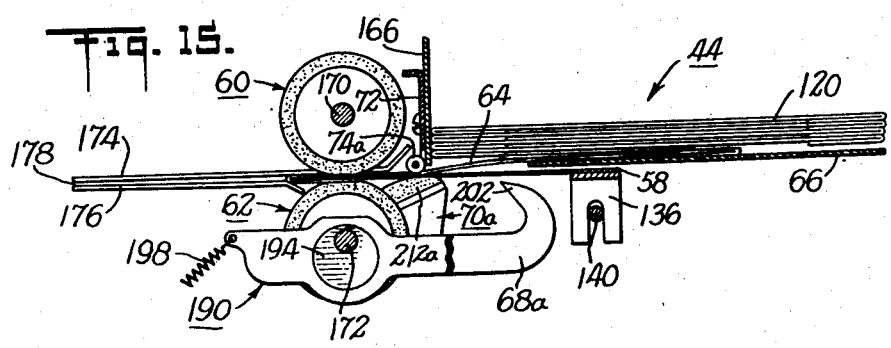
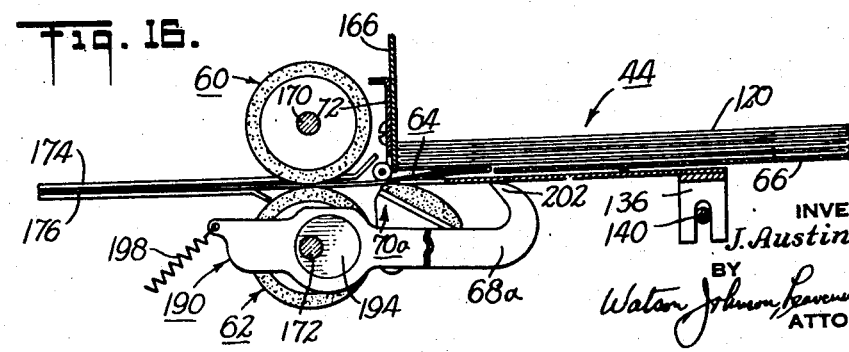

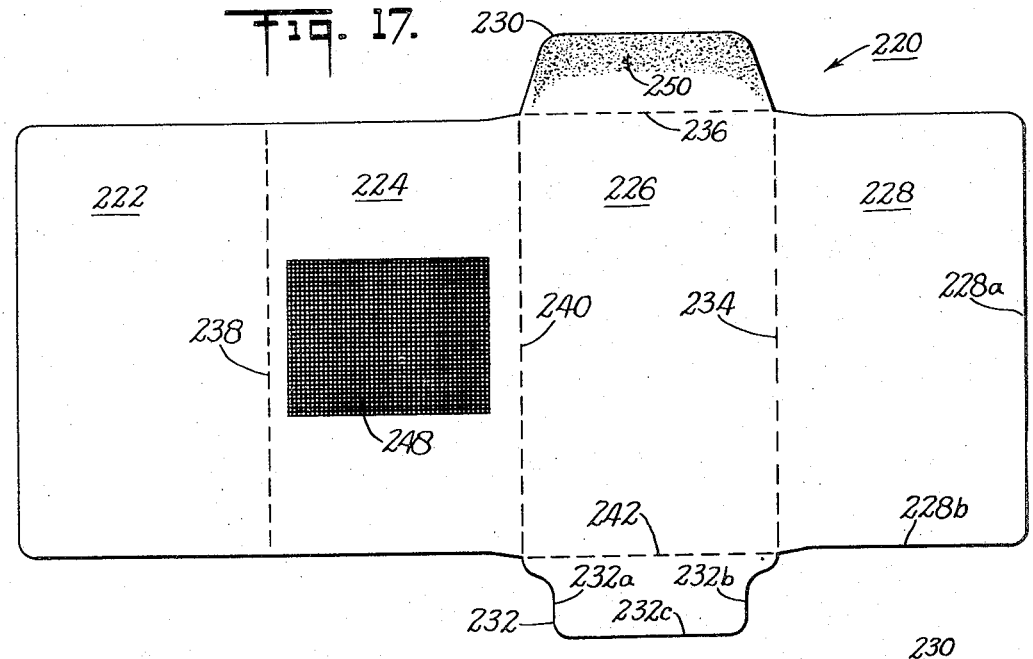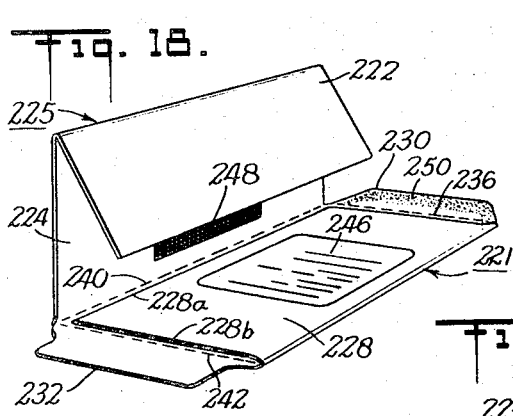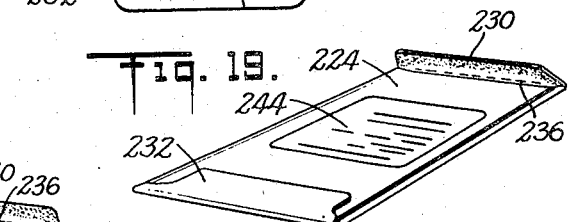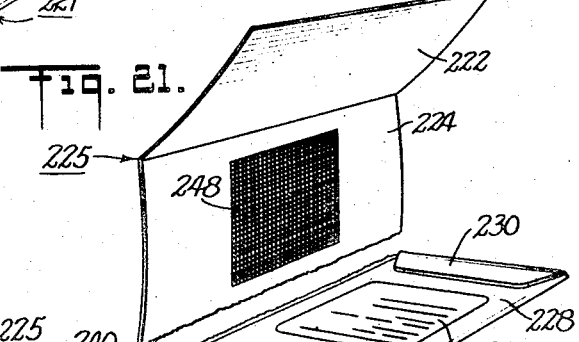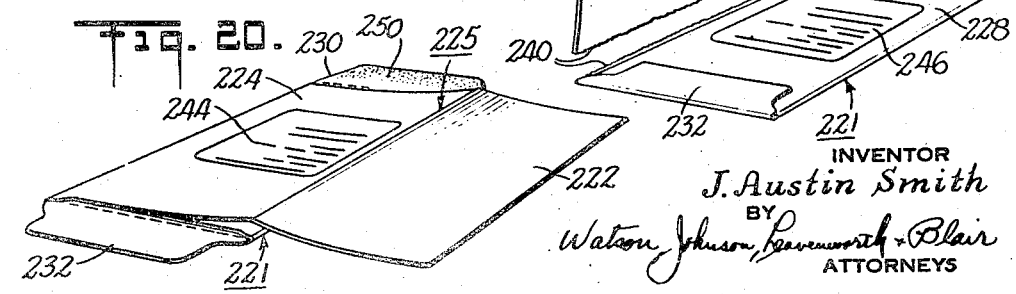

United States Patent Office 2,701,662
Patented Feb. 8, 1955

2,701,662

ENVELOPE DISPENSING MACHINE

Joseph Austin Smith, Los Angeles, Calif., assignor, by mesne assignments, to Ernest H. Woods Company, Inc., a corporation of Alabama Application January 27, 1951, Serial No. 208,183

6 Claims. (Cl. 221—47)

This invention relates to a vending machine, and more particularly to a coin-operative machine for dispensing envelopes. When the envelopes are specially designed and are printed with an appropriate insurance policy form, a machine according to this invention is useful for issuing trip accident insurance policies at railroad stations, bus and airline terminals, gasoline filling stations, etc. Accordingly, this invention also relates to an envelope capable of being dispensed by a machine and useful for an insurance policy.

The sale of merchandise and services by mechanical devices has become widespread, and indeed a vast number and diversity of items can be purchased in this fashion. The efficient, impersonal aspect of a coin-operated machine appeals to the average person, and in recognition of this, machines have been developed to sell to the consuming public such things as beverages, foods and candies, cigarettes, packaged garments, photographs and tickets, to mention only a few. Of a more specialized nature is equipment for dispensing envelopes, where the problems of guarding against errors and fraudulent operation are magnified by the very nature of the item handled, it being a rather thin, delicate fold of paper which might be passed over or missed and not dispensed in a cycle of operation, mutilated by the mechanism, or adhered to another envelope so that two, instead of the intended one, are delivered to the purchaser.

Accordingly it is among the objects of this invention to provide equipment for vending envelopes singly, and in succession. Another object is to provide equipment of this type which is coin-operated and of sturdy construction and particular design as to be tamper-proof. A further object is to provide a coin-operated envelope vending machine which is economical to manufacture, relatively small in size, and of large capacity. Another object is to simplify the design and construction of a machine for vending envelopes so that maintenance charges, as well as initial investment costs, can be kept low, and so that the operating mechanism is easily accessible and readily repairable. A still further object is to provide a relatively simple, inexpensive and compact coin-operated machine which may be used at railroad depots, airline terminals, filling stations and the like, to vend envelope-styled trip accident insurance policies of the type commonly issued to travelers for casualty indemnity of a stated amount during a particular period. Another object is to provide means whereby both insured and insurer have a record of the transaction.

This invention has additional objects of providing a feeding mechanism for a machine of the nature described, and of providing devices for safeguarding operation against fraudulent usage or mistakes. A further object is to provide devices which prevent use of the machine when empty and when a coin is not inserted, while another object is to provide a device which resets the mechanism in the same home position after each cycle of operation. A still further object is to provide devices which make it possible to drive the mechanism in one direction only, and which prevent too rapid operation and possible consequent jamming.

Also an object of this invention is to provide an envelope construction suitable for being dispensed from the bottom of a stack of envelopes by a machine of the nature described. Another object is to provide an envelope construction useful as a trip accident insurance policy when printed with an appropriate form. A still further object is to provide an envelope for these purposes which supplies both purchaser and seller with a record of the transaction, and which is adaptable for the purchase of extended insurance coverage.

Other objects will be in part apparent and in part pointed out in the description which follows.

The invention accordingly consists in the features of construction, combinations of elements, and arrangements of parts, all as will be illustratively described herein, and the scope of the application of which will be indicated in the following claims.

In the drawings, in which one embodiment of the invention is shown:

Fig. 1 is a perspective view of an envelope insurance policy vending machine;

Fig. 2 is a reduced sectional view of Fig. 1 without the upper part of the housing, showing with broken lines the chassis mounting arrangement for an envelope policy storage and vending mechanism;

Fig. 3 is an enlarged side elevation view of the chassis and envelope policy storage and vending mechanism shown in Fig. 2, with the outer housing removed;

Fig. 4 is a horizontal section taken along line 4—4 of Fig. 3;

Fig. 5 is a fragmentary vertical section taken along line 5—5 of Fig. 4;

Fig. 6 is a fragmentary vertical section taken along line 6—6 of Fig. 4;

Fig. 7 is an enlarged fragmentary vertical section taken along line 7—7 of Fig. 4;

Fig. 8 is a fragmentary vertical section taken along line 8—8 of Fig. 7;

Fig. 9 is an enlarged fragmentary vertical section taken along line 9—9 of Fig. 3;

Fig. 10 is an enlarged side view of the coin drum and a part of its lock arm shown in Fig. 3, with the drum rotated to locking position;

Fig. 11 is a vertical sectional view taken along 11—11 of Fig. 10;

Fig. 12 is a view similar to Fig. 10 with the side plate partially broken away to show an inserted coin;

Figs. 13–16 are reduced fragmentary vertical sections showing four successive positions of the envelope feeding mechanism during one cycle of operation;

Fig. 17 is a plan view of a blank of an insurance policy envelope;

Fig. 18 is a perspective view, reduced in size, of the blank shown in Fig. 17 partially folded;

Fig. 19 is a view similar to Fig. 18 showing the envelope completely folded;

Fig. 20 is a view similar to Fig. 19 showing the envelope in position for preparing an insurance application; and Fig. 21 is a view showing separation of the envelope into two parts.

Similar reference characters refer to similar parts throughout the several views of the drawing.

In accordance with one embodiment of the invention, a vending machine adapted for operation on insertion of a coin dispenses specially designed envelopes on which is printed a form for use as a trip accident insurance policy. This envelope is constructed with a detachable fly leaf on which is printed the insurance contract, and space is provided for the insurance applicant to fill out his name and other pertinent information, it being backed with a suitable reproducing coating to transcribe this information onto the envelope. The fly leaf itself is adapted to be separated and retained by the insured as his evidence of purchase, and the envelope must be deposited in a slot for that purpose on the machine housing, so that a record of policies which have been purchased is in possession of the company soliciting the insurance for use in event an accident claim based on any policy is filed at some later date.

According to the procedure here contemplated, the insertion of a coin in the machine purchases an envelope-styled insurance policy, which, when filled out and deposited back into the machine, protects the insured for a specified time at a stated amount. Many applicants, however, desire protection for a longer period or at a greater amount, and this envelope type policy is particularly adaptable for a wide variety of such needs. Any additional coverage over the basic amount derived from the original coin inserted in the machine may be acquired simply by sealing within the envelope, before it is deposited back in the machine, an amount of money appropriate for the insurance purchased, as defined by a premium schedule printed on the policy. Thus a purchaser may conveniently establish further coverage without operating the machine again, and he is able to use odd change and paper bills for this purpose, rather than be restricted to a coin of predetermined denomination.

The machine comprises in general a manually operated vending mechanism encased in a housing, and the entire unit may, with facility, be attached to a wall or may be mounted on a pedestal, as desired. The housing possesses many unique and distinctive features, for besides being strong and locking around the operating mechanism to protect against unwarranted tampering or vandalism, it is attractively decorated and has an illuminated display sign at the top to draw attention and aid in advertising and selling insurance policies. Appropriate openings are provided for inserting and rejecting coins, for receiving and depositing envelopes, and for projecting an operating handle, while its design incorporates a writing desk on the front face to be used when preparing a policy application, and furthermore, instructions for operation and other information may be stencilled at appropriate places on the front and sides.

The housing is divided into two box-like sections, a top portion which lifts off, and a base piece permanently secured to a fixture and having journals on the inside, to which a vending mechanism chassis is pivotally attached. This chassis supports an envelope magazine that rises vertically within the top portion of the housing, and a feeding and ejecting mechanism underneath the magazine which normally projects into the base piece. This arrangement makes it possible to gain complete access to the vending mechanism, for when the top portion of the housing is removed, the entire chassis can be pivoted backwardly to expose the various operating parts mounted therein, this being particularly advantageous in maintaining the vending machine in proper operating condition, in replacing parts, and even in installing an entire new chassis unit.

The envelopes used with this machine, besides being designed with a detachable fly leaf, as above-described, have an ejection flap along the edge opposite the sealing flap edge, which is utilized to eject each envelope from the magazine and deliver it to the purchaser each time the mechanism is operated. Envelopes are stacked flat, one on top another, in the magazine, with ejection flaps on the underside and toward the front of the machine. An ejecting mechanism, hereafter described in detail, engages the ejection flap of the bottom envelope contained in the magazine and conveys that envelope to a feeding device for delivery through a slot in the housing base piece. Various safeguards prevent operation without ejection of an envelope and insure that only one envelope is delivered with each cycle of operation.

A suitable coin selector, disposed on one side of the chassis beside the magazine, delivers a deposited coin to a coin drum mounted upon a shaft through which all operation of the mechanism takes place, and a hand crank fixed to the shaft is available on the outside of the housing. The mechanism is so constructed that a complete cycle of operation occurs with each revolution of this crank, but unless a coin is seated in the coin drum, the shaft cannot be unlocked for turning. A reset cam and cooperating ratchet, both mounted on this same operating shaft, retain the coin drum at rest in its home position to receive a coin. Accordingly, operation is very simple, for one need only drop a coin in the slot provided therefor in the housing, and turn the crank one revolution to acquire an envelope policy. The envelope is projected part way through a slot in the front of the machine, and to complete the transaction an applicant is required to remove the envelope, fill out the attached form, tear off the fly leaf containing the form, place the requisite premium for additional coverage in the envelope, and seal and deposit the envelope in a chute on the top portion of the housing. Thereafter he is insured under the terms of the agreement, and the policies are collected in a separate bin inside the housing behind the deposit chute.

Referring now to the drawings, a trip insurance policy vending machine 25 is shown in Fig. 1, with a housing having a top portion 27 and a base piece 29. When machine 25 is installed for use, base piece 29 is preferably permanently mounted to a suitable wall fixture or on a pedestal (not shown) for, being of relatively small size, it might otherwise be moved in an unauthorized manner. The housing top portion 27 is provided with a flange 27a around the lower edge thereof which incases the upper edge of the base piece 29 and is detachably locked to base piece 29 by any suitable means, not shown, so that it may be lifted off to expose the within envelope dispensing mechanism.

An advertising display sign 26 is situated on housing portion 27, and a coin slot 28 with plunger scavenger 30 is disposed on the front face, as is an envelope inserting slot 32. The front face has an inclined flat surface or writing desk 34, useful in preparing an application for insurance. A hand crank 36 for actuating the dispensing mechanism is located on the right side of machine 25, and a slug reject well 38 is disposed behind this crank.

To acquire a policy form as shown in Fig. 19, the purchaser must place a coin, e. g. a quarter, in coin slot 28. This allows crank 36 to be turned clockwise one revolution, and on so turning, an envelope with a detachable fly leaf is partially fed through slot 40. As described above, to become insured under the terms of the policy, it is necessary to remove the envelope from slot 40, fill in the printed form with one's name and other information (using writing desk 34 for convenience), and then deposit the completed envelope form through slot 32 so that it is retained within machine 25 as the insurer's record. Improper coins or slugs are rejected into well 38, either automatically or by use of plunger scavenger 30. Thus, machine 25 may be operated properly by one never having used it before, for the usual reaction is to deposit a coin and turn crank 36; nevertheless, to dispel any doubt, instructions may be stencilled at appropriate locations, on the face of the housing to furnish full directions and specify the sequence of operation.

The entire dispensing mechanism for machine 25 is constructed as an independent unit within a skeletal chassis 42 (shown generally in Fig. 2 and in detail in Fig. 3) that is contained inside base piece 29 of the housing. Chassis 42 comprises in general an envelope magazine 44 which extends vertically and is encased in housing top piece 27; elements for ejecting and feeding envelopes are disposed below magazine 44.

Base piece 29 (Fig. 2) is shaped like an open-topped box, and is provided with a pair of journals 46 on the back side between which rests chassis 42 pivoted thereto by pins 48 (Figs. 2 and 4). The pins 48 are adapted to slide inwardly of the chassis 42 and are held against inward shifting by any suitable means, such as cotter pins 48a. The inner wall of the housing prevents the pins 48 from shifting outwardly of the chassis. A stop 50 on the front of base piece 29 receives a lug 52 on chassis 42, and a wing bolt 54 threaded into stop 50 passes through lug 52 to firmly but detachably retain chassis 42. This construction greatly simplifies maintenance of machine 25, because to gain access to the operating mechanism it is only necessary to remove housing top piece 27, loosen wing bolt 54, and pivot chassis 42 backwardly to the broken line position in Fig. 2 to expose the entire underside, which is open to leave clear the essential parts for inspection and repair. Should major overhaul appear necessary, the whole operating unit can be replaced with facility by lifting chassis 42 out of journals 46 and installing another chassis containing properly functioning components. Accordingly, it is apparent that many of the problems attending the care of a large number of vending machines are reduced or entirely eliminated by this unique construction, for delays in correcting malfunctioning parts, and costs of maintaining the equipment, are substantially reduced.

Detailed descriptions of the operation of the mechanism contained on chassis 42 appear below, but briefly the following movements take place. Envelopes such as the one shown in Fig. 19 having a free ejection flap 232 are stacked flat in magazine 44 (Fig. 13) with ejection flaps folded underneath in such fashion that ejection flap 64a (corresponding to flap 232 in Fig. 19) of the bottom envelope 64 is exposed through opening 66a in magazine bottom plate 66. Hand crank 36 is fixed to a drive shaft 56 (Figs. 3 and 4) which, when unlocked with a coin and turned, causes forward movement of a flat, plate-like ejector 58 (Fig. 13) and appropriate revolution of pairs of feed rollers 60 and 62 (Figs. 4 and 7), through various linkages and gears. On moving forward, leading edge 58a of ejector 58 (Figs. 13 and 14) engages the fold of sealing flap 64a of bottom envelope 64 and slides envelope 64 from underneath the stack and into engagement with the feed rollers that pass it through envelope slot 40 (Fig. 1). A pair of hooks 68a and 68b (Figs. 4 and 13) pull flap 64a downwardly to insure engagement of the fold by ejector 58, and quadrants 70a and 70b retain it tightly against the underside of ejector 58 (Fig. 14) during ejection to prevent the flexible flap from being extended forward and stripped instead of being gripped when ejected. This precludes failure of delivery of an envelope. A guard plate 72 (Figs. 7 and 13) is spaced in front of opening 66a of magazine bottom plate 66 to retain in magazine 44 the envelope directly above the bottom envelope 64, and friction-reducing rollers 74a and 74b are mounted thereon directly above quadrants 70a and 70b, respectively, to enable envelope 64 to slide under guard plate 72 more freely. Continued rotation of drive shaft 56 causes retraction of ejector 58 and further feeding by rollers 60 and 62, until one complete revolution is made, at which point all movement is arrested and drive shaft 56 is locked in home position. The tail end of envelope 64 is then lightly held between the feed rollers, and it may be withdrawn by pulling on the front portion projecting from slot 40. A detailed description of the function and operation of each of these cooperating elements will now be discussed.

*Coin release and drive shaft locking mechanism*

(Figures 3, 10, 11 and 12)

The envelope dispensing mechanism is actuated through drive shaft 56 which normally is locked against rotation, but which may be unlocked after deposit of a coin. This is accomplished by a coin drum 76 secured to shaft 56. Coin drum 76 is a three-component disc having a spacer 78, to which side plates 80a and 80b are fixed by rivets 79 (Fig. 11). Side plates 80a and 80b have a cutout portion along the top edge forming a hook 82 into which a stud 84 (Fig. 10) cams when drive shaft 56 is revolved clockwise to lock the shaft against further rotation when there has been no coin deposit. Stud 84 is attached to a lever arm 86 (Fig. 3), which is pivoted to side panel 42b of chassis 42 by a suitable pin 88 and urged downwardly by a coil spring 90 attached to the arm 86 and which is also attached to a stud 90a mounted on the side panel 42b.

Spacer 78 (Fig. 11) has a receiver 92 below hook 82 for a coin 94 which, when seated according to Fig. 12, extends above hook 82 so that upon partial rotation of shaft 56 stud 84 cams around the peripheral edge of the coin and thereby overrides hook 82. Drive shaft 56 may then be fully rotated, and coin 94 will roll out of receiver 92, as shown in broken lines in Fig. 12, into a suitable bin (not shown). Hence at the end of one revolution hook 82 will again be free to engage stud 84 and lock drive shaft 56.

A coin deposited into slot 28 (Fig. 1) passes by gravity down an intake chute 96 (Fig. 3) and through a suitable coin selecting mechanism 98 fastened to side panel 42b of chassis 42. A legal coin will pass through selector 98 and be directed into coin drum 76 by way of a coin accept chute 100, at which time drive shaft 56 may be revolved by use of hand crank 36, as above described. Slugs or deformed coins do not enter drum 76, for they are shunted by selector 98 through slug reject chute 101 into reject well 38 (Fig. 1) on the side of the machine housing.

This construction provides a sturdy, efficient and inexpensive drive shaft locking and releasing mechanism having as its only moving part a stud cam follower mounted on a lever arm, and there is no possibility of operating the mechanism unless a coin is deposited therein.

*Drive shaft reset and retaining mechanism*

(Figures 3, 4, 5 and 7)

Drive shaft 56 (Fig. 3) is so oriented in its home position that coin drum 76 lies directly underneath coin accept chute 100 in position to receive a coin, and when so oriented, hook 82 is displaced angularly counterclockwise of stud 84 so that no interference is encountered by a coin with stud 84. Means now to be described are provided to prevent counter-clockwise rotation of drive shaft 56, and to allow shaft 56 to be oscillated between its home position and the point where hook 82 is stopped by stud 84.

Rotation counter-clockwise of shaft 56 is prevented generally by a ratchet 112 fixed thereto behind coin drum 76, and its engaging pawl 114 (Fig. 5). Pawl 114 is pivotally connected to panel 42b by a suitable pin 116, and is urged against ratchet 112 by a spring 118. Teeth 112a of ratchet 112 are slanted to the left to engage pawl 114 when shaft 56 is turned counter-clockwise, and to slip past the pawl on clockwise movement. However, ratchet 112 has a section 112b without teeth, over which pawl 114 rests when shaft 56 is in the home position, as shown in Figure 5, permitting a small counter-clockwise movement of shaft 56. Hence drum 76 may be returned to home position for receiving a coin should crank 36 be turned while the drum is empty, for hook 82 engages stud 84 before pawl 114 slips over tooth 112c at the end of section 112b.

Means cooperating with ratchet 112 are provided to seat shaft 56 in home position at the end of each revolution, and to return it to said position if crank 36 is turned without a coin being deposited in drum 76. As shown in Fig. 7, this is accomplished by a reset cam 102 fixed to shaft 56 on the far side near panel 42a of chassis 42, and a follower 104 attached to a lever arm 106 which is pivoted to panel 42a by a pin 108 and urged downwardly by a coil spring 110. One end of the spring 110 is attached to the arm 106 and the other end is attached to a stud 106a mounted on the plate 42a. When shaft 56 is rotated a complete revolution, follower 104 rides around peripheral edge 102a of reset cam 102, and drops into a valley 102b defining a normal, home position at the end of the revolution where coin receiver 92 of drum 76 is aligned with chute 100 (Fig. 3). Valley 102b (Fig. 7) has convex sides 102c and 102d designed so that spring-loaded arm 106 with its follower pressing down urges reset cam 102 back to its home position. Hence an operator who tests the vending machine without depositing a coin will find that it locks when crank 36 is turned a few degrees. Yet, when the handle is released, it will return where a coin can be received in drum 76, because side 102c of cam 102 will have ridden under follower 104 which urges the cam back due to the slope of side 102c. Should a coin be deposited while drum 76 is locked against stud 84, it will remain in accept chute 100 and rest along the peripheral edge of drum 76 until the drum is returned to normal with receiver 92 in alignment.

Cam 102 also functions to place a drag on shaft 56, and thereby prevent racing and possible jamming of the ejecting and feeding mechanism by over-enthusiastic operation of hand crank 36. The increased diameter of cam 102 away from valley 102b displaces follower 104 upwardly and accordingly increases the tension of spring 110, causing more pressure and consequent drag to be placed between these engaging surfaces.

A sturdy, economical combination is thus provided to maintain the drive shaft in home position after each revolution, to prevent counter-clockwise rotation and excessive speed of operation, and to allow slight oscillation between lock and home positions when a coin is not contained in the drum.

*Envelope feeding and ejecting mechanism*

(Figures 3–9 and 13–16)

Machine 25 has a high capacity for insurance policies even though it is relatively small in size. This is because the special envelopes on which the policy forms are printed are stacked flat, one on another, in vertical magazine 44 and are dispensed one at a time directly from the bottom of the magazine by a mechanism now to be described.

To load the machine with insurance policy envelopes, top piece 27 (Fig. 1) of the housing is removed to expose internal chassis 42 (Fig. 3) that defines between its side panels 42a and 42b magazine 44. A stack of envelopes 120 is loaded through the open top of magazine 44 and a weighted cover 122 is placed on top to compress the stack and impose a downward bias thereon. A back panel 124 is detachably mounted on chassis 42 by locking studs 126 which slip into slots 128 of the side panels, providing additional access to the magazine.

Each envelope of stack 120 is placed in magazine 44 with its ejection flap on the underside toward the front of the machine, as shown in Figure 13 whereby ejection flap 64a of lowermost envelope 64 is exposed through opening 66a in magazine bottom plate 66. Means to prevent operation of machine 25 when magazine 44 is empty is provided by a lock-out arm 130 (Figs. 3 and 4) pivotally mounted at point 132 to the outside of panel 42b, with an upper end 130b engaging a lockout mechanism (not shown) in coin selector 98, and a lower end 130a protruding inside magazine 44 almost to bottom plate 66. Accordingly when a stack of envelopes 120 runs out, lower end 130a is free to move inwardly on being pivoted at point 132, allowing upper end 130b to shift and thereby divert coins thereafter deposited in the machine to reject chute 101.

Ejection of the lower envelope 64 (Fig. 13) from the bottom of magazine 44 is accomplished by ejector 58, a flat plate which is slidably mounted below bottom plate 66 in suitable bearing blocks 134a and 134b fastened to the lower edges of chassis sides 42a and 42b respectively (Fig. 9). Chassis 42 is assembled by securing together with screws 164, flanges 160 of side panels 42a and 42b, flanges 162 of bottom plate 66, and bearing blocks 134a and 134b, while a front panel 166 (Fig. 7) and removable back panel 124 (Fig. 3) provide the necessary side support. Ejector 58 (Fig. 9) has fixed to its bottom side a yoke 136 having slots 138 (Fig. 13) at each end resting over a connecting rod 140 (Fig. 9) by which, through a driving linkage, ejector 58 is oscillated forward to eject an envelope from magazine 44 and then back to its home position during each cycle of operation. A pair of links 142 are respectively pivoted to the ends of connecting rod 140 (see Fig. 4) and extend upwardly therefrom, their upper ends being pivotally connected respectively to chassis panels 42a and 42b as at 143 (Fig. 3). A pair of coil springs such as spring 144, with one end extending over trunnion 48 of chassis 42 and the other hooking into a hole 145 in link 142, urges the two links to their rearward rest position. Connecting arms 146a and 146b (Figs. 3 and 4) are respectively attached to the opposite ends of connecting rod 140 and complete a linkage through pivot pins 148 with drive arms 150a and 150b, which are respectively fixed to the ends of a shaft 152 journaled in panels 42a and 42b. One revolution of shaft 152 causes drive arms 150a and 150b to rotate once completely and thus functions as cranks, with pivots 148 moving in circular paths. On the first half of the turn each pivot 148 moves down and toward the left as viewed in Fig. 3, drawing connecting arm 146b with it, this in turn pulling connecting rod 140 forward and similarly moving yoke 136. Ejector 58 being attached to yoke 136 is thereby moved forward, or to the left as viewed in Fig. 13. On the second half of the turn, pivot 148 moves up and toward the right as viewed in Fig. 3, replacing each element of the linkage to its rest position. In so moving, ejector 58 engages the fold of sealing flap 64a of bottom envelope 64 in magazine 44 (which is exposed through opening 66a in bottom plate 66), delivers envelope 64 to feed rollers 60 and 62, and then returns to its original position.

Shaft 152 (Figs. 4 and 6) is caused to rotate in the same direction and with the same speed as drive shaft 56 by a gear linkage on the outside of side panel 42a, consisting of spur gears 154 and 156 fixed to shafts 56 and 152, respectively, meshing with pinion 158 rotatably attached to panel 42a.

Ejector 58 (Fig. 4) has a cut-out portion 58b at the middle of its leading edge 58a such that on forward movement envelope 64 will be delivered directly into engagement with the pairs of feed rollers 60 and 62, which function within the side limits of cut-out portion 58b. These feed rollers are provided with soft rubber tires 168 (Fig. 7) and are keyed respectively to shafts 170 and 172 that are journaled in panels 42a and 42b. There is just enough vertical clearance at the nip of upper and lower feed rollers to receive and grip envelope 64 and feed it by friction to slot 40 in the housing. Upper feed rollers 60 revolve in the same direction as drive shaft 56, while lower feed rollers 62 turn in the opposite direction and at the same speed as the upper rollers. The driving mechanism is powered from shaft 56 and comprises a sprocket 180 (Figs. 4 and 5) keyed to shaft 56 just inside panel 42b, meshing with an endless ladder chain 182 in turn meshing with a sprocket 184 keyed to shaft 170 on which upper feed rollers 60 are mounted. Thus rotation of drive shaft 56 rotates shaft 170.

Identical spur gears 186 and 188, fixed respectively to the ends of shafts 170 and 172 projecting from panel 42b, mesh to rotate shaft 172 oppositely but at the same speed as shaft 170 as the latter is driven by drive shaft 56. Hence the feed rollers are rotated by positive drive means during the entire cycle of operation resulting from turning hand crank 36 one revolution; therefore, envelope 64 will be gripped and fed through whenever it is delivered for engagement with the feed rollers. Flanged plates 174 and 176 fixed to panel 42a define an opening 178 for guiding one edge of envelope 64 as it passes through chassis 42 (Fig. 7), and corresponding plates on panel 42b guide the opposite edge.

As previously mentioned, certain safety features are incorporated into the mechanism to make certain that bottom envelope 64, and only that one, is ejected from magazine 44. More specifically, a pronged rake 190 (Fig. 14) pulls sealing flap 64a down in front of ejector 58 so that it will not be missed by the ejector; guard plate 72 is so spaced as to allow only one envelope at a time to pass under it, and quadrants 70a and 70b press against the underside of flap 64a during ejection and prevent it being pushed straight out by ejector 58 with consequent failure to feed.

Rake 190 (Figs. 3, 7 and 13) has two prongs or hooks 68a and 68b which, upon actuation of the rake, enter opening 66a in bottom plate 66 of magazine 44 and pull down sealing flap 64a of envelope 64 before ejector 58 moves into engagement at the fold of flap 64a, to avoid any possibility of ejector 58 sliding underneath flap 64a and thereby missing the envelope in its forward stroke. Rake 190 (Fig. 7) is rotatably mounted at its hub 192 on an eccentric 194 fixed to shaft 172, between lower feed rollers 62, and its forward end 196 is downwardly biased by a spring 198 anchored to a bar 200 extending between side panels 42a and 42b. Thus hooks 68a and 68b are urged upwardly against the bottom of magazine 44 when spring 198 is under tension. In the home position, shown in Figs. 7 and 13, hook 68a protrudes through opening 66a and rests against the underside of envelope 64 behind flap 64a (the other hook 68b is similarly positioned) so that on shifting to the left its sharply pointed tip 202 opens the flap.

When shaft 172 revolves counter-clockwise during a cycle of operation, eccentric 194 shifts rake 190 to the left where hooks 68a and 68b slide above and open flap 64a, the quarter-turn or extreme position of leftward movement being shown in Figure 14. Simultaneously, ejector 58 moves into engagement with the fold of the envelope and flap, above tip 202. Continued rotation of eccentric 194 depresses rake 190 and removes tension from spring 198, and therefore hook 68a drops below ejector 58 as the half-turn position of Fig. 15 illustrates. Further rotation again elevates rake 190, during which time ejector 58 is on its return stroke, their positions at a three-quarter turn being shown in Fig. 16. Finally, a complete cycle withdraws ejector 58 from above hook 68a, and point 202 rises against the bottommost envelope, as in Fig. 13, which has replaced the dispensed envelope 64. Accordingly, the flap on the bottom envelope is always opened and its fold is engaged when the mechanism is ejecting.

To guard against ejector 58 driving toward flap 64a with such force or with such speed as to push through and straighten the flap without withdrawing envelope 64 from magazine 44, a pair of spring-loaded quadrants 70a and 70b (Figs. 7 and 8) are rotatably mounted below opening 66a of the magazine in such position as to be passed over and contacted by the ejector supported envelope flap and then by ejector 58 on its forward stroke. These quadrants tightly press flap 64a against the underside of ejector 58 and retain it from shifting forward and unfolding from envelope 64. Quadrant 70a (Fig. 8) is mounted on a shaft 206a carried by a bracket 204a fixed to panel 42a; about shaft 206a is coiled a spring 208a to urge it clockwise against a stop 210a (Fig. 7). A soft rubber crown 212a on quadrant 70a is arced from below opening 66a to a point 214a in the path of ejector 58 and is engaged by the ejector supported envelope flap when the ejector moves forward. This places crown 212a under compression to hold flap 64a firmly against ejector 58. Being rotatably mounted and arced, quadrant 70a rolls counter-clockwise and continues to press against flap 64a as ejector 58 moves forward (Fig. 14) until envelope 64 is grasped by the feed rollers, after which ejector 58 merely slides freely over crown 212a for a short distance (Fig. 15). During the return stroke of ejector 58 (Fig. 16), quadrant 70a is rolled back to its normal home position shown in Fig. 13 and is retained against stop 210a by spring 208a.

Similarly functioning members corresponding to those of quadrant 70a are located on the opposite side of rake 190 (Fig. 8), where quadrant 70b is mounted to panel 42b by a bracket 204b. Quadrant 70b is retained on bracket 204b by a shaft 206b having a spring 208b holding it against stop 210b, and a rubber crown 212b extends to a point 214b in the path of ejector 58, so that a balanced pressure is exerted against flap 64a during ejection.

Guard plate 72 mounted on the front of front panel 166 prevents more than one envelope being fed from magazine 44 during a single operation (Figs. 7 and 8). Plate 72 is secured with screws 216 through elongated slots 218, allowing vertical adjustment to a level where envelope 64 will clear its lower edge, but the next envelope above will be blocked (Figs. 13 and 14). Rollers 74a and 74b (Fig. 8) are rotatably attached at the lower edge of guard plate 72 in suitable cut-outs 74c therein on the front side above quadrants 70a and 70b respectively, to reduce friction and prevent abrasion of the top of an envelope being forced through from magazine 44.

Withdrawal of envelope 64 from magazine 44 is accomplished by the coaction of ejector 58, quadrants 70a and 70b, and guard plate 72. The rest position is shown in Fig. 13, where ejector 58 is fully retracted underneath bottom plate 66 of magazine 44. Flap 64a of bottom envelope 64 in stack 120 is exposed through opening 66a in bottom plate 66, and tip 202 of hook 68a projects against envelope 64 behind flap 64a under the force of spring 198 (reference here will be made only to the elements illustrated in Figs. 13-16, it being understood that quadrant 70b and hook 68b function identically and simultaneously with quadrant 70a and hook 68a respectively). Quadrant 70a is urged to the right against stop 210a (Fig. 7) by spring 208a with point 214a of crown 212a in the path of ejector 58.

At the start of a cycle of operation eccentric 194 (Fig. 13) shifts hook 68a to the left and downwardly by virtue of counter-clockwise rotation of shaft 172 and flap 64a is thereby separated from the bottom of envelope 64 by tip 202. At the same time ejector 58 begins its movement to the left, and, at the quarter-turn of shaft 172 (Fig. 14), its leading edge has passed over tip 202 and engaged the flap fold. At this same position, point 214a of quadrant 70a presses against the underside of flap 64a and since the movement of the body of the envelope is resisted by pressure of the stack above, continued advance of ejector 58 bends the free portion of envelope 64 so that its leading edge is drawn downwardly away from lower edge 166a of magazine front panel 166, as shown in Figure 14.

Advance of ejector 58 then directs envelope 64 under guard plate 72 and quadrant 70a freely rotates counter-clockwise to press flap 64a against the underside of ejector 58 during the time the greatest force is being exerted against the fold; accordingly danger of flap 64a being extended ahead with attendant failure of the mechanism to feed the envelope is avoided. Envelopes above in the magazine are automatically retained by front panel 166 and guard plate 72 is spaced so that but one envelope at a time will pass thereunder. Rollers 74a and 74b (Fig. 8) at the lower edge of guard plate 72 reduce the friction as envelope 64 passes by, and ejector 58 slides over the rear edge of the quadrant crowns after flap 64a has been moved beyond the quadrants.

The half-turn represented by Fig. 15 marks the forwardmost advance of ejector 58, and at this position envelope 64 has been delivered well into the nip of rollers 60 and 62, as a cut-out portion 58b (Fig. 4) in ejector 58 allows leading edge 58a to straddle the rollers. The rollers rotate throughout the cycle of operation of the mechanism and revolve in opposite directions to feed envelope 64 forward through the guiding opening 178. At the half-turn eccentric 194 has moved rake 190 to its lowermost position, and quadrant 70a has advanced its limit forward.

Fig. 16 shows the three-quarter turn of shaft 172 where ejector 58 is retracted under the magazine and quadrant 70a has returned nearly to rest position. At this stage envelope 64 is still being fed by rollers 60 and 62, and eccentric 194 has shifted rake 190 upward and to the right where point 202 strikes the underside of ejector 58. A complete revolution returns all elements to the rest position of Fig. 13 where point 202 enters opening 66a behind the flap of the bottom envelope in magazine 44, and ejector 58 is retracted behind hook 68a. Here envelope 64 will have been directed through slot 40 (Fig. 1) where it is available to be withdrawn for use. This construction therefore provides a means for delivering without fail a single envelope only during each cycle of operation of machine 25.

*Insurance policy envelope*

(Figures 17–21)

A blank 220 for a specially designed envelope capable of being dispensed by machine 25 and useful as an accident trip insurance policy form is shown in Fig. 17. Blank 220 has four folding panels 222, 224, 226 and 228 of approximately equal dimensions, and flaps 230 and 232 at each end of panel 226, the former for sealing and the latter for ejection. Panel 228 folds along line 234 onto panel 226 and is sealed along edges 228a and 228b to define an envelope 221 open below fold 236 of sealing flap 230 (Fig. 18). In completing assembly of blank 220, panel 222 is folded along line 238 onto panel 224, and then both of these panels are folded along perforated edge 240 onto panel 228 (Figs. 18 and 19). Both flaps 230 and 232 remain on the outside and are folded down onto panel 224, flap 230 along line 236, and flap 232 along line 242. Envelope 221 is loaded into magazine 44 with the flap side down and the edge defined by the fold along line 242 forward, and is ejected by flap 232 with panels 224 and 222 folded in place.

Ejection flap 232 has sides 232a and 232b curved inwardly, a straight edge 232c, and is free of any adhesive; hence engagement by hooks 68a and 68b during ejection is unhindered. Use of ejection flap 232 on envelope 221 makes it possible to adopt a mechanism whereby a single envelope can be withdrawn from the bottom of a high stack, and therefore a high-capacity, simple machine can be used for dispensing these envelopes.

The insurance policy is printed on the detachable fly-leaf 225 defined by panels 222 and 224, which may be torn free of envelope 221 along perforated line 240, and an application blank 244 is printed on the exposed side of panel 224 for the purchaser to write his name and other pertinent information. Instructions and a schedule of premiums for extended coverage is printed on the exposed side of panel 226, and an application blank 246 is placed on panel 228 directly below blank 244 when panel 224 is in place, the latter being backed by a carbon coating 248 for transposing the information written thereon to blank 246.

To acquire insurance protection according to the terms of the policy, the purchaser unfolds panel 222 and fills in blank 244 on panel 224 as it is held against panel 228 to transpose the writing by carbon coating 248 to blank 246 on panel 228 (Fig. 20), though each blank may be filled in separately if desired. Following this, fly-leaf 225 is detached along perforated line 240 and retained by the purchaser as his copy of the policy. Envelope 221 may then be sealed with flap 230, which is provided with a gummed coating 250 for that purpose, and deposited into slot 32 in usual fashion to complete the transaction.

Accordingly this construction provides an envelope which may be ejected from the bottom of a stack of envelopes, while the procedure above outlined provides a simple, speedy way of purchasing a single insurance policy having the flexibility to meet most traveler's requirements, and the necessity of operating the vending machine repeatedly with the requisite number and denominations of coins is eliminated when extended coverage is desired.

Therefore time is saved, and the traveler is greatly convenienced.

Summary of operation

A complete cycle of operation of machine 25 to acquire an insurance policy envelope will now be described.

Referring to Fig. 1, a coin inserted in slot 28 passes through intake chute 96, selector 98, and accept chute 100 into receiver 92 of coin drum 76 as shown in Fig. 3. In turning hand crank 36 clockwise as viewed in Fig. 1, coin 94 seated in drum 76 causes stud 84 to cam around hook 82 and free the drive shaft. As rotation progresses, coin 94 rolls out of receiver 92, and hook 82 is thereafter unobstructed to engage stud 84 after a complete revolution and lock the machine (Fig. 12).

Hand crank 36 turns drive shaft 56 through which shafts 170 and 152 are caused to rotate, since ladder chain 182 (Figs. 4 and 5) connects shafts 56 and 170 through sprockets 180 and 184, and pinion 158 (Fig. 6) joins gears 154 and 156 attached respectively to shafts 56 and 152. Upper feed rollers 60 fixed to shaft 170 are accordingly revolved, and through gears 186 and 188 (Fig. 5) shaft 172 carrying lower feed rollers 62 revolves oppositely to shaft 170.

As shaft 152 turns, drive arms 150a and 150b (Figs. 3 and 4) crank mounting arms 146a and 146b forward and then back to cause ejector 58 to be shifted similarly through connecting rod 140 and yoke 136. The spring-held yoke 142 rocking underneath yoke 136 provides smooth, balanced movement of ejector 58.

As ejector 58 moves forward or to the left as viewed in Fig. 13, it rides against the fold of flap 64a of bottom envelope 64, which is exposed through opening 66a in magazine bottom plate 66 and which is drawn down in front of ejector 58 by rake 190 eccentrically mounted on shaft 172. This forces envelope 64 from magazine 44, under guard plate 72, and into engagement with revolving feed rollers 60 and 62 which deliver it through slot 40 (Fig. 1) in the machine housing as ejector 58 is returned to its rest position for the next cycle of operation. During ejection flap 64a is tightly held against the underside of ejector 58 by quadrants 70a and 70b (Figs. 4, 8 and 14) which shift with it. At the end of the turn of hand crank 36, follower 104 (Fig. 7) rides into valley 102b of cam 102 to reset shaft 56 in its rest position, and ratchet 112 and pawl 114 (Fig. 5) limit rotation to one direction.

Since certain changes may be made in the above article, and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. An envelope vending machine comprising, in combination, a magazine for aligning envelopes in stacked relationship, a bottom plate for said magazine having an opening adjacent its front edge, an ejector slidably mounted below said bottom plate for engaging the fold of the flap of an envelope exposed through said bottom plate opening, means for moving said ejector forward, and hook means synchronously operative with said ejector moving means to draw said flap downwardly in front of said ejector as said ejector moves forward to engage said fold and eject the bottom envelope from said magazine.

2. An envelope vending machine comprising, in combination, a magazine for aligning envelopes in stacked relationship, an ejector slidably mounted below said magazine for engaging the fold of the flap of the bottom envelope, means for moving said ejector forward, hook means synchronously operative with said ejector moving means to draw said flap downwardly in front of said ejector as said ejector moves forward to engage said fold and eject the bottom envelope from said magazine, and means for moving said ejected envelope away from said magazine.

3. An envelope vending machine comprising, in combination, a magazine for aligning envelopes in stacked relationship, envelopes stacked flat in said magazine each having a flap on the front edge for successive exposure, an ejector slidably mounted below said magazine, means for moving said ejector forward to engage the fold of the flap of the bottom envelope and eject said bottom envelope from said magazine, hook means synchronously operative with said ejector moving means for engaging said flap and drawing it down in front of said ejector as said ejector moves forward, and means for pressing said flap against said ejector during ejection.

4. An envelope vending mechanism comprising, in combination, a magazine for aligning envelopes in stacked relation, each of said envelopes having a flap on the underside along its forward edge, a bottom plate for said magazine having an opening adjacent its front edge through which the flap of the bottom envelope is exposed, an ejector slidably mounted below said bottom plate for engaging the fold of the bottom envelope flap and pushing said bottom envelope out of said magazine, means for moving said ejector forward, hook means synchronously operative with said ejector moving means for engaging said flap and drawing it down in front of said ejector as said ejector moves forward, means for retaining said flap below said ejector during ejection, a pair of oppositely rotating feed rollers disposed one above another in front of said magazine for moving an ejected envelope away from said magazine, a powered drive shaft, and means for transferring power from said drive shaft to said feed rollers and to said ejector moving means.

5. A mechanism for removing the bottom envelope from a stack of envelopes contained in a magazine wherein a flap of the bottom envelope is exposed through an opening in the bottom of said magazine, comprising, in combination, a reciprocating ejector plate slidably mounted below said magazine for engaging the fold of said flap, means for reciprocating said ejector plate, a rake synchronously actuated with said reciprocating means for drawing said flap downwardly before said ejector plate moves into engagement with said fold, a spring-loaded quadrant pivotally mounted below and in the path of said ejector plate for retaining said flap underneath said ejector plate after engagement, and a guard plate spaced above said ejector plate to allow passage of only one envelope at a time from said magazine.

6. A mechanism for removing the bottom envelope from a stack of envelopes contained in a magazine wherein a flap of the bottom envelope is exposed through an opening in the bottom of said magazine comprising, in combination, a reciprocating ejector plate slidably mounted below said magazine for engaging the fold of said flap, means for reciprocating said ejector plate, a rake synchronously actuated with said reciprocating means for drawing said flap downwardly before said ejector plate moves into engagement with said fold, a spring-loaded quadrant pivotally mounted below and in the path of said ejector plate for retaining said flap underneath said ejector plate after engagement, a guard plate spaced above said ejector plate to allow passage of only one envelope at a time from said magazine, and a pair of feed rollers mounted one above another and rotating in opposite directions for moving an ejected envelope away from said magazine.

References Cited in the file of this patent

UNITED STATES PATENTS

| Number | Name | Date |
|---|---|---|
| 373,355 | Fowler et al. | Nov. 15, 1887 |
| 999,009 | Cleal et al. | July 25, 1911 |
| 1,269,672 | Armstrong | Jan. 18, 1918 |
| 1,367,667 | Munro | Feb. 8, 1921 |
| 1,423,792 | Gowdy | July 25, 1922 |
| 1,455,241 | Colosi | May 15, 1923 |
| 1,756,418 | Woods | Apr. 29, 1930 |
| 1,918,737 | Brunton | July 18, 1933 |
| 1,995,809 | Benjamin | May 22, 1934 |
| 1,989,249 | Sebell | Jan. 29, 1935 |
| 1,991,865 | Olsen | Feb. 19, 1935 |
| 2,041,089 | Rowe | May 19, 1936 |
| 2,076,513 | Hoban | Apr. 6, 1937 |
| 2,096,729 | Bird | Oct. 26, 1937 |
| 2,106,171 | Fogelson | Jan. 25, 1938 |
| 2,339,681 | Casey | Jan. 18, 1944 |
| 2,540,930 | Campbell et al. | Feb. 6, 1951 |
| 2,571,831 | Cain | Oct. 16, 1951 |